United States Patent [19]
Hays, Jr.

[11] 3,806,934
[45] Apr. 23, 1974

[54] INERTIAL LEAD VERTICAL SPEED INDICATOR/GLIDE SLOPE DIRECTOR

[75] Inventor: Robert F. Hays, Jr., Charlottesville, Va.

[73] Assignee: Teledyne, Inc., Los Angeles, Calif.

[22] Filed: Aug. 7, 1972

[21] Appl. No.: 278,627

[52] U.S. Cl....... 343/108 R, 235/150.22, 244/77 A, 340/27 NA, 343/5 LS
[51] Int. Cl.............................................. G01s 1/18
[58] Field of Search...... 343/108, 5 LS; 340/27 NA; 235/150.22

[56] References Cited
UNITED STATES PATENTS
3,230,507  1/1966  Holt ................................ 343/108 R
3,165,745  1/1965  Pike et al. ......................... 343/5 LS Primary Examiner—Richard A. Farley
Assistant Examiner—Richard E. Berger

[57] ABSTRACT

The broad principle upon which the invention is based is to employ a vertical speed indicator having an element movable in accordance with vertical speed of the carrying aircraft, and a director index movable in accordance with the vertical speed command signal derived from a glide slope deviation signal, the aircraft being manipulated so that the movable element will track the director index; the glide slope deviation signal may be the output of a conventional glide slope receiver or the deviation may be determined by a ground based radar system, the deviation being transmitted to the aircraft by radio. Various details and refinements are described in the following specification.

7 Claims, 7 Drawing Figures

3,806,934

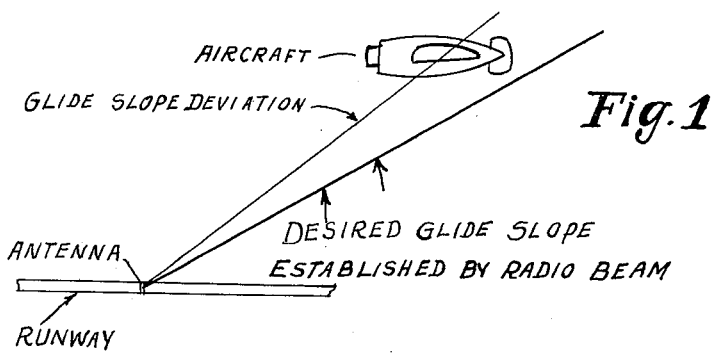

Fig. 1

AIRCRAFT
GLIDE SLOPE DEVIATION
DESIRED GLIDE SLOPE ESTABLISHED BY RADIO BEAM
ANTENNA
RUNWAY

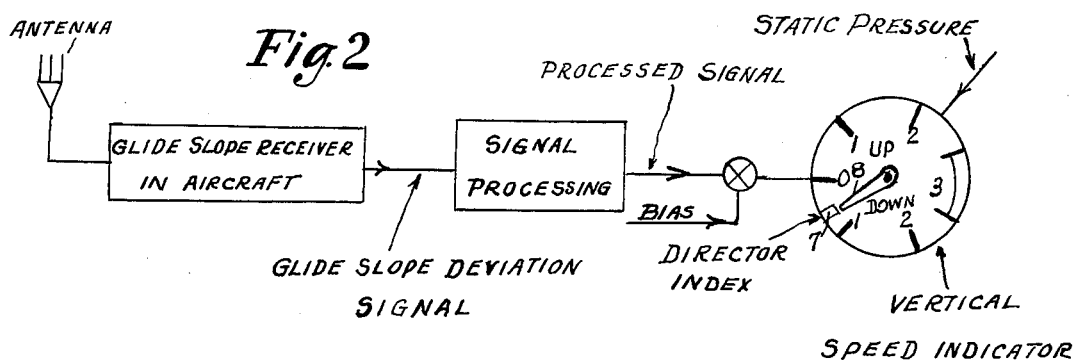

Fig. 2

ANTENNA → GLIDE SLOPE RECEIVER IN AIRCRAFT → SIGNAL PROCESSING → (BIAS) → VERTICAL SPEED INDICATOR

STATIC PRESSURE
PROCESSED SIGNAL
GLIDE SLOPE DEVIATION SIGNAL
DIRECTOR INDEX

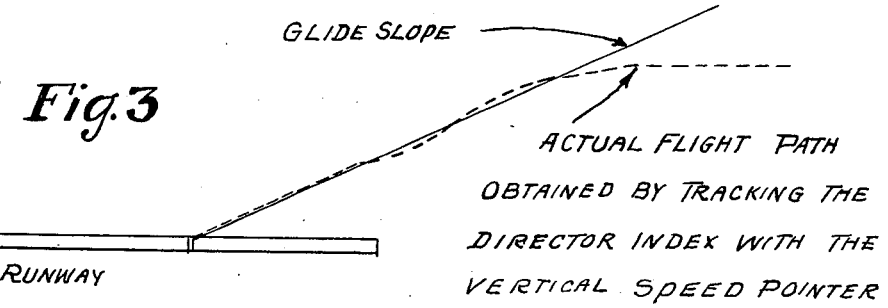

Fig. 3

GLIDE SLOPE
ACTUAL FLIGHT PATH OBTAINED BY TRACKING THE DIRECTOR INDEX WITH THE VERTICAL SPEED POINTER
RUNWAY

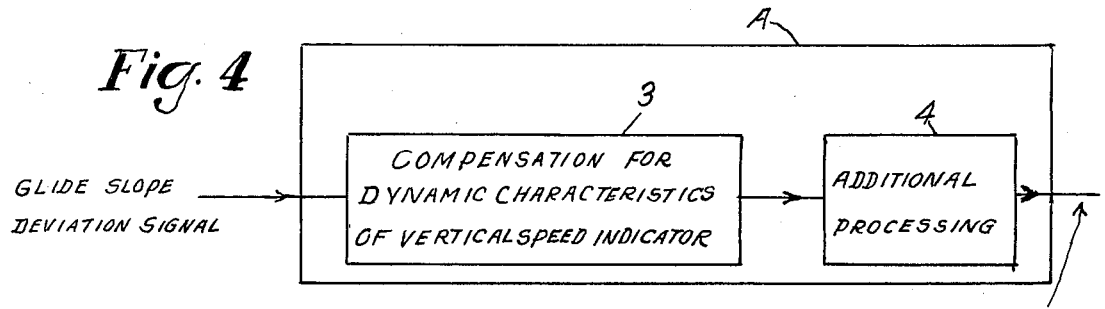
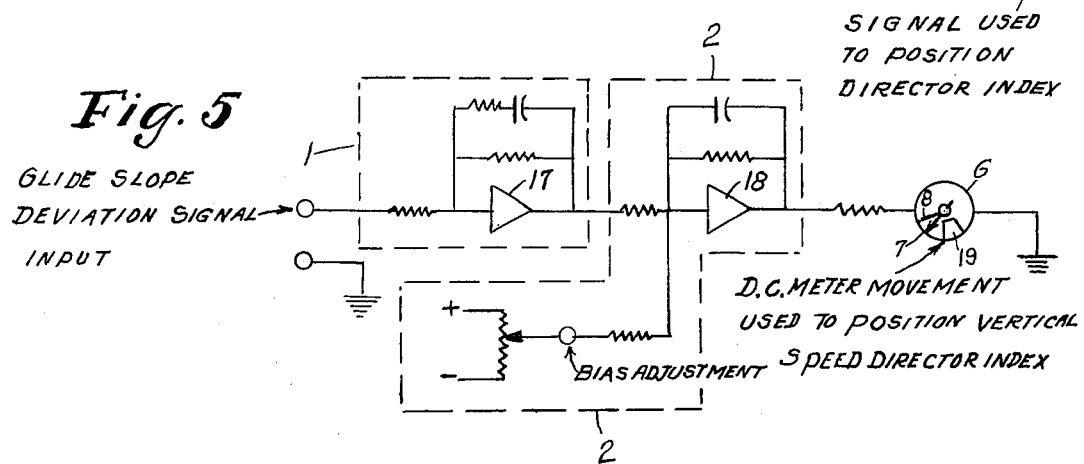
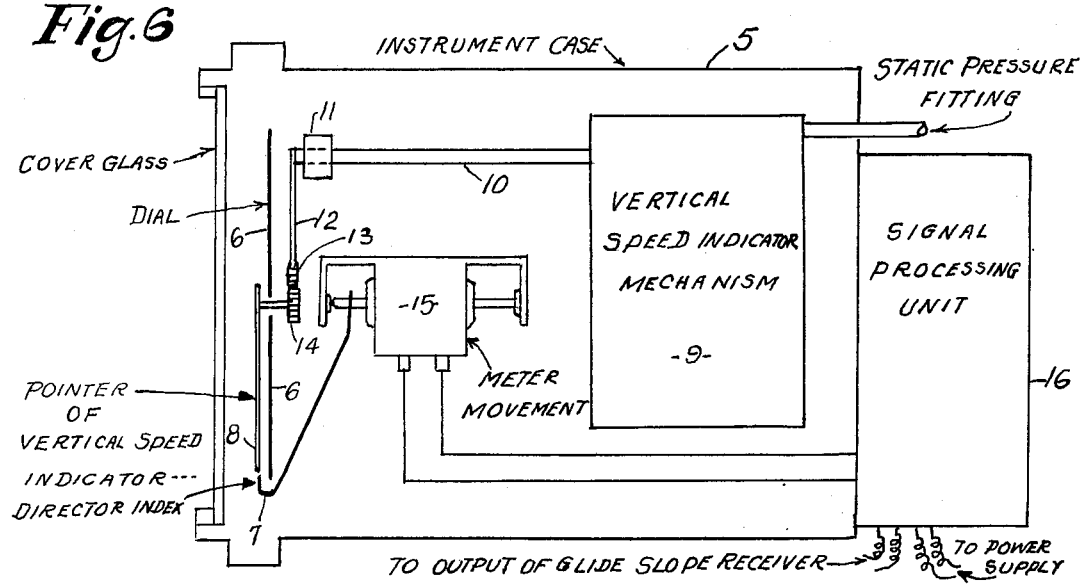

INERTIAL LEAD VERTICAL SPEED INDICATOR/GLIDE SLOPE DIRECTOR

This invention relates to a combined vertical speed indicator and glide slope director.

During an instrument landing approach the aircraft is controlled to keep the vertical speed pointer in coincidence with the director index. The result is that the aircraft will go to and remain on the desired flight path with good stability even though there may be variations in wind velocity, vertical drafts, and bends in the radio beam down which the aircraft is flying to the runway.

An object of the invention is to provide a relatively simple and reliable instrument or instrument system which will be of marked assistance to pilots in making safe aircraft instrument landing approaches as a result of the system having dynamic characteristics making it easy for the pilot to control the instrument reading to the value called for by the director index and in such manner that the aircraft follows the desired glide slope with good stability.

Another object is to provide an instrument system which will produce accurate and effective vertical speed commands for landing an aircraft even though wind velocities, vertical drafts, and bends in the radio beam down which the aircraft is flying may be quite variable.

A further object is to provide an instrument system for furnishing a pilot reliable, meaningful commands which can be easily executed during an instrument landing approach by an aircraft, said instrument system being assembled largely from known, tested aircraft instruments or components.

An additional object is to provide a reliable instrument system for landing aircraft safely and easily, said system including, in part, standard instruments or components which can be obtained at reasonable cost.

Further objects will be evident in the following description.

IN THE DRAWINGS

FIG. 1 is a sketch showing a runway, a glide slope transmitter, the desired glide slope, a landing aircraft, and the deviation of the aircraft from that glide slope.

FIG. 2 is a block diagram of circuitry in combination with an instrument having an element positioned according to vertical speed of the aircraft and a director index positioned according to a vertical speed command which is derived by the circuitry processing the glide slope deviation signal from the glide slope receiver. Glide slope receivers are available on the open market.

FIG. 3 is a line drawing or sketch showing the actual flight path obtained by tracking the director index with the vertical speed pointer.

FIG. 4 shows a block diagram of a signal processing unit including a unit for compensation for dynamic characteristics of a vertical speed indicator, and an additional processing unit for the glide slope deviation signal.

Figure 7:
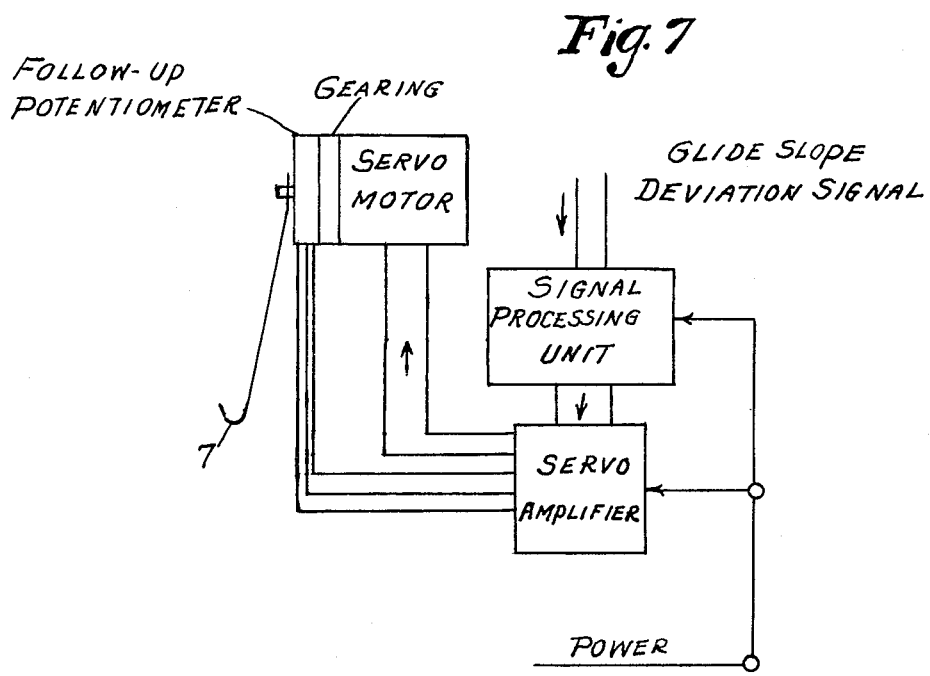

FIG. 5 shows in box 1 circuit details for the compensation unit 3 of FIG. 4 and box 2 contains circuit details for the additional processing unit 4 of FIG. 4.

FIG. 6 is largely a line drawing of an assembled unit 5 containing a pointer driven by a vertical speed indicator mechanism, and a director index driven by a meter movement.

FIG. 7 is a diagrammatic illustration of a system using a servo for positioning the index member.

The glide slope deviation signal may be the output of a conventional glide slope receiver used with the conventional double beam ILS system. The glide slope deviation may be determined by a radar system located on the ground and the deviation transmitted to the aircraft by means of radio. Over water or flat terrain the glide slope deviation may be determined by use of a radio altimeter and DME in which case DEVIATION = $h/D - \sin \gamma$ where $h$ = radio altitude D = distance from the runway, and $\gamma$ = inclination of the desired flight path; likewise h may be the altitude above the runway as determined by an aneroid altimeter.

In operation, the director index 7 shown in FIGS. 2 and 6 moves around the peripheral edge of the vertical speed indicator dial 6 and pointer 8 is positioned by means of vertical speed indicator mechanism 9, shaft 10, bearing 11, sector 12, sector gear 13, and pinion 14. The various movable parts are, of course, suitably supported. Similarly, director index 7 is moved circularly or arcuately by meter unit 15 which is responsive to the vertical speed command signal which is derived from the glide slope deviation signal. The aircraft should be controlled so that the pointer 8 will track the director index 7.

When a commercially available meter movement is used to position the director index the angular movement is limited. The director index may be positioned by means of a servo so that the index may be driven to any angular position on the dial.

It is possible, of course, to position the index also by means of a servo. The dynamic characteristics of the entire control loop, including the aircraft, the inertial lead vertical speed indicator, the signal processing unit, and the pilot are such that it is very easy for the pilot to track the director index with the vertical speed pointer, and such tracking, even if it is not done precisely or continuously, results in the aircraft following the glide slope with excellent stability and with extremely small deviations. Such performance depends largely upon the signal processing unit 16 of FIG. 6 having the proper dynamic characteristics.

Instrument landing approaches in tests made by those using my system and with no previous flying experience were considerably better than instrument landing approaches made by professional pilots under the same conditions and using a conventional flight director system. The maximum deviations from the glide slope, using my improved system, were only 30 percent as great as the maximum deviations made by the professional pilots, using the flight director.

My system can be used with an ordinary vertical speed indicator which has an exponential lag of approximately five seconds; but, considerably better performance is obtained by using the inertial lead vertical speed indicator in which some of the lag in the response of the indicator to a change in vertical speed is eliminated by the use of normal or vertical accelerometers. The dynamic characteristics of the signal processing unit must be tailored to the characteristics of the vertical speed indicator in order to produce a system having optimum characteristics.

A schematic of the signal processing unit A of FIG. 4, which was used in the flight tests, is illustrated in FIG. 5, the circuitry in box 1 of FIG. 5 being contained in block 3 of FIG. 4 and the circuitry in box 2 of FIG. 5 being contained in block 4 of FIG. 4. Amplifier 17 and its associated circuitry was used to adapt the system to the dynamic characteristics of the type of vertical speed indicator that was used in my system. The transfer function for this amplifier circuit is $Eo/Ei = 1 + 1.6 S/1 + 6 S$ where $Eo$ = LaPlace transform for the output voltage of the first part of the signal processor and $Ei$ = the LaPlace transform of the input signal to this part of the signal processor. S is the LaPlace operator. This circuit compensates for the dynamic characteristic of the vertical speed indicator which, if desired, may be an instrument manufactured by TELEDYNE AVIONICS and sold under the tradename IVSI.

Amplifier 18 and its associated circuitry was used for additional signal processing to improve further the ease with which the aircraft can be manipulated to follow the glide slope. The transfer function for this amplifier circuit is:

$Eo/Ei = 1/1 + 5 S$

The meter movement used to position the director index was a fast response type having near critical damping. The delay in the response of this meter movement to the applied signal was negligible compared with the other delays in the system. The director index can be positioned by a highly damped or slow responding meter movement or by a highly damped servo so that the lag in the index movement in response to a change in the applied signal can be used as a part of the signal processing. For example, amplifier 18 and its associated circuitry is not needed if the director index is positioned by a servo or a meter movement for which the transfer function is approximately $Hc/Ei = 1/1 + 5 S$ which is equal to the response of amplifier 18 and its associated circuitry.

$Hc$ = command rate of descent or position of the director index. $Ei$ = input voltage to the servo or meter. If the scale of the vertical speed indicator is non-linear then the displacement of the meter movement or servo should have the same type of non-linearity so that the vertical speed commanded by the index will be correct. If the scale is linear then the angular deflection of the index should be linear. The vertical speed commanded by the director index must correspond to the output voltage of the signal processor. There are three possibilities:

1. If the scale of the vertical speed indicator is linear then the angular deflection of the index relative to the voltage applied to the meter movement or servo must be linear.
2. If the scale of the vertical speed indicator is non-linear then the angular deflection of the index relative to the voltage applied to the meter movement or servo must be non-linear in the same fashion.
3. If the scale of the vertical speed indicator is non-linear and the angular deflection of the index is linear relative to the voltage applied to the meter movement or servo then the output of the signal processor must be passed through a non-linear circuit before it is applied to the linear meter movement or servo in order to make the commanded vertical speed correspond to the output signal from the signal processor.

There are other considerations in the design of my improved instrument system. Provision is made for causing the director index to move rapidly behind a mask where it cannot be seen, in the event of loss of electrical power or loss of the glide slope deviation signal which could occur as the result of failure of the glide slope transmitter on the ground.

FIG. 5 shows a bias input to amplifier 18. A signal output from amplifier 18 is required to cause the director index to move from behind the mask 19 which is supported along its peripheral edge and is separated from dial 6 sufficiently to allow movement of index 7 and pointer 8 without hindrance. The index 7, when desired, can be caused to move under mask 19. When the index 7 moves from behind mask 19 it can be used as a down-scale reference to command a desired rate of descent. If this output resulted only from a glide slope deviation signal, then the flight path of the aircraft would be above the desired radio glide slope by an amount proportional to the rate of descent. Such a stand-off error can be reduced by increasing the gain of the amplifiers; but there is a limit to how high the gain can be made without deteriorating the stability of the system. The bias was provided so that the director index could be positioned to the proper rate of descent without a glide slope deviation being required. The bias is fixed at a nominal value depending upon the normal rate of descent that is employed in the type of aircraft which is used.

Changes in the rate of descent from the normal value can result from changes in the ground speed of the aircraft or changes in the inclination of the radio glide slope. If the bias is fixed such changes will result in the aircraft flying slightly off the glide slope but the deviation will be extremely small. In some extreme cases, such as in helicopters making landing approaches at very steep angles, it may be necessary to provide an adjustment for the bias or to make provision for automatically adjusting the bias.

I have built and satisfactorily tested my improved Vertical Speed Indicator-Glide Slope Director System and I have been quite pleased to notice that even an untrained person can satisfactorily land an aircraft by using my system as described. This system should provide a degree of flying assurance and safety hitherto unknown, especially for pilots who do not make instrument landing approaches frequently enough to maintain a high level of proficiency with conventional ILS instruments.

While a vertical speed indicator having a mechanical pointer, and a mechanical director index are shown, it is possible to use light beams, lighted portions of a dial, or similar construction, if desired. Furthermore a laser beam may be used to define a glide slope instead of a radio beam in which case the deviation signal can be derived from visible or invisible light, by means of photosensitive means, or the equivalent. Deviations from a desired flight path may also be computed by using as inputs to the computer an altitude signal from an aneroid altimeter and a distance signal from DME (Distance Measuring Equipment).

As a variation of my system described above, $h$ can be divided by ground speed to produce flight path angle so that the pointer, 8, indicates flight path angle of the aircraft relative to the ground. In this case the director index 7 would indicate the commanded flight path angle instead of the commanded rate of descent. When my instrument is constructed so that the director index may be positioned over a wide range of vertical speed including climb as well as descent it may be used as a part of a VNAV System. VNAV is an area navigation system in which the flight path of the aircraft is controlled in all three dimensions. In this case an output from the VNAV computer positions the vertical speed director index as may be required to keep the aircraft on the desired flight path including climbing as well as descending and level flight paths.

What I claim is:

1. In an aircraft instrument system, means for indicating vertical speed of said aircraft, means providing director means having an element movable in accordance with the deviation of said aircraft from a reference flight path, means for biasing the director means movable element to a predetermined vertical speed, means for determining deviation of the aircraft flight path from a reference flight path, a member of said vertical speed indicating means being displaceable in proportion to the rate of change of altitude of said aircraft, said means for indicating vertical speed of said aircraft including the same movable director element displaceable relative to said vertical speed indicating movable member, said director means element and said vertical speed indicating member being arranged so that said vertical speed indicating member will be coincident with said movable director means element when said aircraft is following the reference flight path.

2. The system as described in claim 1, and including in said aircraft a glide slope receiver producing as output a glide slope deviation signal, as said flight path deviation, signal processing means connected with said glide slope signal producing means, a meter movement for actuating said director means movable element, and the output of the said signal processing means being connected with said meter movement.

3. The aircraft instrument system as described in claim 1, and including means for amplifying flight path deviation from the reference flight path to minimize tracking errors and errors of approximation, and including dynamic processing of the output of said flight path deviation determining means.

4. The aircraft instrument system as described in claim 1, said means for indicating aircraft vertical speed being also responsive to normal acceleration.

5. The system described in claim 1 in which the said flight path deviation determining means is embodied as computer means for computing flight path deviation using measurements and estimates of aircraft vertical distance from a reference point, aircraft horizontal distance from a reference point, and the tangent of the flight path angle as inputs to the said computer means.

6. The system described in claim 1 in which the said flight path deviation determining means is remotely located from said aircraft and said flight path deviation means output communicated to said aircraft by radio or similar means.

7. The system described in claim 1 in which the said flight path deviation determining means is embodied as computer means for computing flight path deviation using measurements and estimates of aircraft vertical distance from a reference point, aircraft range from a reference point, and the sine of the flight path angle as inputs to the computer; said range being the distance along a straight line connecting said aircraft and said reference point.

* * * * *